United States Patent [19]

Bonk et al.

[11] 4,080,314
[45] Mar. 21, 1978

[54] POLYURETHANE ELASTOMERS BASED ON ALCOHOL-MODIFIED DIISOCYANATE

[75] Inventors: Henry W. Bonk, Wallingford; Benjamin S. Ehrlich, Cheshire; Joseph Pleckaitis, North Haven, all of Conn.

[73] Assignee: The Upjohn Company, Kalamazoo, Mich.

[21] Appl. No.: 666,086

[22] Filed: Mar. 11, 1976

[51] Int. Cl.$^2$ ............................................. C08G 18/76
[52] U.S. Cl. ..................... 260/75 NT; 260/77.5 AT; 260/77.5 MA
[58] Field of Search ................ 260/2.5 AT, 77.5 AT, 260/77.5 AA, 77.5 MA

[56] References Cited

U.S. PATENT DOCUMENTS

| 3,294,713 | 12/1966 | Hudson et al. | 260/2.5 AM |
|---|---|---|---|
| 3,463,758 | 8/1969 | Stewart | 260/75 NK |
| 3,715,381 | 2/1973 | Spaunburgh et al. | 260/77.5 AT |
| 3,769,265 | 10/1973 | Groegler et al. | 260/77.5 AT |

FOREIGN PATENT DOCUMENTS 1,438,145  6/1976  United Kingdom.

OTHER PUBLICATIONS

DOS, 2418075, Oct. 30, 1975, Bayer A/G.

Primary Examiner—H.S. Cockeram
Attorney, Agent, or Firm—Denis A. Firth; John Kekich

[57] ABSTRACT

The processing temperatures of thermoplastic polyurethane elastomers are reduced, and the extrudability and sensitivity to shear and moisture are improved, by employing as the diisocyanate, in the preparation of said elastomers, the product obtained by reacting 4,4'-methylenebis(phenyl isocyanate) with a monohydric aliphatic alcohol. Use of the latter also counteracts batch-to-batch variations in reactivity of 4,4'-methylenebis(phenyl isocyanate).

21 Claims, No Drawings

POLYURETHANE ELASTOMERS BASED ON ALCOHOL-MODIFIED DIISOCYANATE

BACKGROUND OF THE INVENTION

1. Field of the Invention

This invention relates to polyurethane elastomers and to their preparation and is more particularly concerned with polyurethane elastomers derived from modified 4,4'-methylenebis(phenyl isocyanate) and with processes for their preparation.

2. Description of the Prior Art

A wide range of thermoplastic non-cellular polyurethanes is currently available for use in the preparation of articles by injection molding, extrusion and like techniques. These elastomers are generally prepared by reaction of a diisocyanate, a polymeric diol and a difunctional extender. These materials require care both in the processes used for their manufacture and in the molding processes to which they are subjected in producing fabricated articles.

Thus the materials in question are subject to partial degradation upon exposure to high temperatures for excessive periods during manufacture or processing. In addition they are extremely sensitive, at the elevated temperatures employed in manufacture and or processing, to reaction with atmospheric moisture with subsequent undesirable effects on physical properties. The sensitivity to moisture is increased in direct proportion to the temperature to which the polymer is exposed during manufacture and processing. It is accordingly desirable to develop methods for reducing or minimizing these problems.

Further, it is extremely important that the properties of any particular polyurethane elastomer be maintained within clearly specified boundaries in order to ensure uniformity from batch-to-batch in processing behaviour and characteristics as well as in physical properties of the fabricated articles. One of the factors which can materially effect the reproducibility of properties of these elastomers is the variation from batch-to-batch in reactivity of the diisocyanate employed in their preparation. It is accordingly also desirable to devise methods for eliminating or markedly reducing the variation in reactivity of said diisocyanate.

It is an object of this invention to provide polyurethane elastomers which can be processed by molding, extrusion and the like at temperatures lower than those hitherto employed thereby reducing sensitivity to degradation by heat and atmospheric moisture. It is a further object to reduce significantly the variation in reactivity of diisocyanates thereby facilitating reproducibility of properties of polyurethane elastomers derived therefrom.

These objectives are achieved by employing as the diisocyanate a 4,4'-methylenebis(phenyl isocyanate) which has been pre-reacted with a trace of a monohydric alcohol.

The use of such monohydric alcohols, commonly referred to in the art as chain terminators, for other purposes is well known; see, for example, U.S. Pat. Nos. 3,350,361; 3,384,623; 3,425,973; 3,483,167; 3,761,439; and 3,823,111. These references show carrying out various polyurethane forming reactions either in the presence of the monohydric alcohol or with addition of the monohydric alcohol at the end of the reaction to terminate the latter. Monohydric alcohols have also been employed widely as capping or masking agents, for example, to cap the free isocyanate groups in an isocyanate-terminated prepolymer which is to be stored in combination with a chain extender to provide a composition which, upon heating at any desired time, will regenerate the free isocyanate groups and lead to formation of a polyurethane.

U.S. Pat. No. 3,294,713 describes the reaction of a mixture of polymethylene polyphenyl polyisocyanates with a monohydric alcohol in sufficient quantity for the latter to react with from 2 to 50 percent of the isocyanate groups present in the polyisocyanate. The polyisocyanate so treated is said to have improved compatability with the other components employed in the formation of polyurethanes and to give rise to more flexible cellular products.

To the best of our knowledge it has not previously been suggested that 4,4'-methylenebis(phenyl isocyanate) be modified in the manner described herein nor that such a modified isocyanate be employed in the preparation of polyurethane elastomers. It has also not been recognized that the resulting elastomers would have the highly desirable properties set forth below.

SUMMARY OF THE INVENTION

This invention comprises an improved thermoplastic polyurethane elastomer which is the product of reaction of an organic diisocyanate, a polymeric diol, and a difunctional extender and wherein the improvement comprises employing as the organic diisocyanate the product of reaction of 4,4'-methylenebis(phenyl isocyanate) and from 0.0005 to 0.05 equivalents, per equivalent of said diisocyanate, of a monohydric alcohol.

The invention also comprises a modified 4,4'-methylenebis(phenyl isocyanate) which is the product of reacting 4,4'-methylenebis(phenyl isocyanate) with from 0.0005 to 0.05 equivalents, per equivalent of said diisocyanate, of a monohydric alcohol.

DETAILED DESCRIPTION OF THE INVENTION

The polyurethane elastomers of the invention can be prepared by processes conventional in the art for the synthesis of polyurethane elastomers, the novel feature being the use of the 4,4'-methylenebis(phenyl isocyanate) which has been modified by reaction with the minor amount of a monohydric alcohol. The conventional preparative processes include the one-shot procedure, in which all the reactants are brought together simultaneously, and the prepolymer procedure, in which the isocyanate (modified as described herein) is reacted with a portion, or the whole, of the polymeric diol in a first step and the isocyanate-terminated prepolymer so produced is subsequently reacted with the remainder of the polyol and or extender. The one-shot method is the preferred procedure for preparing the elastomeric polyurethanes of the invention. In a most preferred embodiment, the elastomeric polyurethanes of the invention are prepared by a continuous one-shot procedure such as that set forth in U.S. Pat. No. 3,642,964.

The modified 4,4'-methylenebis(phenyl isocyanate) which is employed in the preparation of the polyurethane elastomers of the invention is prepared conveniently by bringing together the 4,4'-methylenebis(phenyl isocyanate) and the monohydric alcohol in the appropriate proportion by equivalents, i.e. in proportions such that there are from 0.0005 to 0.05 equivalents of said alcohol per equivalent of said isocyanate. Preferably there are from about 0.001 to about 0.02 equivalents of said alcohol per equivalent of said isocyanate. A most preferred proportion of equivalents of said alcohol to said isocyanate is of the order of 0.01 equivalents.

Advantageously the diisocyanate is first heated to its melting point (circa 43° C) and the alcohol is added slowly with stirring to the molten diisocyanate. Reaction generally occurs spontaneously without the need to apply any additional heat to the reaction mixture. Preferably the reaction is conducted in an atmosphere of inert gas such as nitrogen and in the absence of atmospheric moisture. The progress of the reaction is generally fairly rapid and the end point can be detected by routine analytical procedures such as infrared spectroscopy, nuclear magnetic resonance spectroscopy and the like, carried out on an aliquot. When the reaction is deemed complete, the modified 4,4'-methylenebis(phenyl isocyanate) so obtained can be employed, without further treatment, in the preparation of the polyurethane elastomers of the invention.

The monohydric alcohols which are employed in preparing said modified 4,4'-methylenebis(phenyl isocyanate) are inclusive of primary and secondary alkanols, mono- and poly-alkoxyalkanols, alkenols, and cycloaliphatic alcohols all of which preferably have a carbon atom content within the range of 1 to 18. Illustrative of alkanols are n-butyl alcohol, sec-butyl alcohol, pentyl alcohol, 1-hexanol, 2-hexanol, octanol-2, octanol-1, nonyl alcohol, decanol-1, decanol-3, undecyl alcohol, dodecyl alcohol, pentadecyl alcohol, hexadecyl alcohol, octadecyl alcohol, and the like. Illustrative of mono- and poly-alkoxyalkanols are the ethyl, butyl, hexyl, octyl, decyl and like alkyl monoethers of ethylene glycol, 1,3-propylene glycol, 1,4-butanediol, 1,2-hexanediol, diethylene glycol, dipropylene glycol, tripropylene glycol, and the like. Illustrative of cycloaliphatic alcohols are cyclobutanol, cyclopentanol, cyclohexanol, cycloheptanol, 1-methylcyclohexan-2-ol, and the like.

Illustrative of alkenols are vinyl alcohol, allyl alcohol, methacrylyl alcohol, butenyl, alcohol, hexenyl alcohol, octenyl alcohol, dodecenyl alcohol, pentadecenyl alcohol, octadecenyl alcohol, and the like.

Preferred monohydric aliphatic alcohols for use in the preparation of the modified 4,4'-methylenebis(phenyl isocyanate) are the alkanols and the mono- and poly-alkoxyalkanols. Particularly preferred species are n-butyl alcohol, dodecyl alcohol and the monobutyl ether of diethylene glycol (commonly referred to as butyl Carbitol).

In preparing the polyurethane elastomers of the invention from the modified 4,4'-methylenebis(phenyl isocyanate) there can be employed any of the polymeric diols and extenders conventionally employed in the art for the preparation of such elastomers. The polymeric diols advantageously have molecular weights in the range of 400 to 4000 and preferably within the range of about 500 to about 3000. Illustrative of polymeric diols are polyester diols and polyether diols having molecular weights within the above range. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or their anhydrides) employed in the preparation of the polyester diols are adipic, succinic, pimelic, suberic, azelaic, sebacic, terephthalic, phthalic, and the like acids or their anhydrides or mixtures of two or more said acids or anhydrides. Adipic acid is the preferred acid. Representative glycols employed in the preparation of the polyester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

In addition to the above type of polyester diols, there can also be used the polycaprolactone diols which are prepared by polymerizing the appropriate caprolactone with the appropriate difunctional initiator, such as aliphatic glycol as exemplified above or an alkanolamine such as ethanolamine, propanolamine, butanolamine, and the like. Such procedures and products are well-known in the art; see, for example, U.S. Pat. No. 2,914,556. A particularly preferred polyester diol is that obtained by initiating the polymerization of ε-caprolactone with 1,4-butanediol.

The polyether polyols employed in the preparation of the polyurethane elastomers of the invention include the polyether glycols having molecular weights in the above defined range and prepared by reacting ethylene oxide, propylene oxide, butylene oxide, or mixtures thereof with water or with diols such as ethylene glycol, 1,2-propylene glycol, 1,3-propanediol, 1,4-butanediol, 2,3-butanediol, 1,5-pentanediol, 1,2-hexanediol, diethanolamine, resorcinol, catechol, bis(p-hydroxyphenyl)methane, diethylene glycol, dipropylene glycol, and the like.

The extenders which are employed in preparing the polyurethane elastomers of the invention can be any of the difunctional active hydrogen containing extenders commonly employed in the art. The latter are inclusive of glycols, diamines, amino alcohols, and the like. Illustrative of diol extenders are aliphatic diols, advantageously containing from 2 to 6 carbon atoms, inclusive, such as ethylene glycol, 1,3-propylene glycol, 1,2-propylene glycol, 1,4-butanediol, 1,2-hexanediol, neopentyl glycol, and the like; and dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether thereof. Illustrative of diamine extenders are aromatic diamines such as p-phenylenediamine, m-phenylenediamine, benzidine, 4,4'-methylenedianiline, 4,4'-methylenebis(2-chloroaniline) and the like. Illustrative of amino alcohols are ethanolamine, propanolamine, butanolamine, and the like.

As set forth above, the polyurethane elastomers of the invention are preferably made by the one-shot procedure and most preferably by a continuous one-shot procedure. In such procedures the reactants are brought together in any order. Advantageously, the polymeric diol and the extender are preblended and fed to the reaction mixture as a single component, the other major component being the modified diisocyanate. The mixing of the reactants can be accomplished by any of the procedures and apparatus conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25° C) and the resulting mixture is then heated to a temperature of the order of about 40° C to about 130° C, preferably to a temperature of about 90° C to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20° C to about 115° C. The time required for curing will vary with the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

When the compositions of the invention are prepared by the less preferred prepolymer method, the modified diisocyanate and the polymeric diol are reacted, if desired, in the presence of a catalyst as defined above, in a preliminary stage to form an isocyanate-terminated prepolymer. The proportions of modified diisocyanate and polymeric diol employed in the preparation of this prepolymer are consistent with the ranges defined above. The diisocyanate and the polymeric diol are preferably rendered substantially free from the presence of extraneous moisture, using the methods described above, before the formation of the prepolymer is carried out. The formation of the prepolymer is advantageously carried out at a temperature within the range of about 70° C to about 130° C under an inert atmosphere such as nitrogen gas in accordance with conventional procedures. The prepolymer so formed can then be reacted, at any desired time, with the extender to form the elastomers of the invention. This reaction is carried out advantageously within the range of reaction temperatures specified above for the one-shot procedure. In general the prepolymer and the extender are mixed and heated within the requisite temperature range while the mixture is degassed as described previously. The degassed mixture is then transferred to a suitable mold, extrusion apparatus, or the like, and cured as described for the one-shot procedure.

In carrying out the above described reactions, both one-shot and prepolymer, the various reactants are employed in such proportions that the ratio of isocyanate groups in the modified diisocyanate to the total number of hydroxyl groups in the polymeric diol and extender is within the range of 0.92:1 to 1.10:1 and, preferably, within the range of 0.98.1 to 1.04:1. Further, as will be appreciated by one skilled in the art, the proportion of polymeric diol to extender can be varied within a wide range depending largely upon the desired hardness of the final polyurethane elastomer. Advantageously, the molar proportion of polymeric diol to extender is within the range of 0.05: 1 to 2:1 and, preferably, within the range of 0.1:1 to 1:1.

If desired, the elastomers of the invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

The polyurethane elastomers of the invention are characterized by improved properties, particularly in regard to their behaviour on fabrication by injection molding or extrusion, as compared with the corresponding polyurethane elastomers prepared from 4,4'-methylenebis(phenyl isocyanate) itself rather than the modified diisocyanate. Thus the polyurethane elastomers of the invention possess significantly lower melt viscosity than do the polyurethane elastomers which correspond in all respects except that they are prepared from unmodified 4,4'-methylenebis(phenyl isocyanate). This lowered melt viscosity enables the polymers to be molded by injection molding or extrusion at lower temperatures and with much greater facility.

Further we have found that the polymers of the invention show much less tendency to degrade under shear forces applied in the above molding techniques. The polymers of the invention are also much less sensitive to degradation by reaction with atmospheric moisture during processing than are the polymers corresponding in all respects except that unmodified 4,4'-methylenebis(phenyl isocyanate) was used in their preparation. The above differences are illustrated by the data set forth in the examples which follow. It is worthy of note that the above improvement in behaviour of the polymers during molding is not accompanied by any decrease in the desirable physical properties of the elastomeric polyurethanes.

The modified 4,4'-methylenebis(phenyl isocyanate), prepared as described hereinbefore and employed as the novel intermediate in the preparation of the polyurethane elastomers of the invention, also represents a valuable means of standardizing the reactivity characteristics of 4,4'-methylenebis(phenyl isocyanate) and can, accordingly, be used in place of 4,4'-methylenebis(phenyl isocyanate) in any of the many and varied ways in which this diisocyanate is currently employed. Thus, 4,4'-methylenebis(phenyl isocyanate), even in the highly purified form in which it is currently supplied commercially, contains trace impurities which affect its reactivity, i.e. the rate and manner in which the diisocyanate reacts with active hydrogen containing compounds. Further, since the amounts and proportions of these trace impurities can vary from batch to batch, it is frequently necessary to modify standard formulations, employed to prepare polyurethanes from said diisocyanate, by adjusting catalyst levels and the like, before the diisocyanate can be used. This represents a problem particularly for the relatively small manufacturer who may not be equipped with adequate testing facilities to make the necessary formulation adjustments and the like.

By modifying the 4,4'-methylenebis(phenyl isocyanate) by reaction with very small amounts of monohydric alcohol in the manner described above it has been found, surprisingly, that the variations in reactivity between batches of the diisocyanate, hitherto observed, can be reduced to acceptable levels and the above problems thereby solved. Accordingly, the development of the modified 4,4'-methylenebis(phenyl isocyanate) of this invention represents a significant contribution to the art over and above the particular usefulness of this material in preparing the polyurethane elastomers of the invention.

The following examples describe the manner and process of making and using the invention and set forth the best mode contemplated by the inventors of carrying out the invention but are not to be construed as limiting.

EXAMPLE 1

A series of four elastomers was prepared using the reactants and proportions set forth in Table I below. In the case of Elastomer A no monohydric alcohol was employed, whereas, in the case of Elastomers B, C, and D, a monohydric alcohol was prereacted with the diisocyanate prior to manufacture of the elastomer. The procedure involved in the reaction of the diisocyanate and the monohydric alcohol comprised heating the diisocyanate to 125° F under nitrogen and under anhydrous conditions and adding the monohydric alcohol to the diisocyanate with stirring. The mixture was then stirred and maintained at 125° F under nitrogen before being degassed under reduced pressure and used in the preparation of the elastomer.

The procedure involved in the latter preparation was the same in all cases and was as follows. The polytetramethylene glycol was degassed by heating at 110° C under reduced pressure for 30 minutes. The butanediol, antioxidant and lubricant were added to the tetramethylene glycol and the resulting mixture was again degassed at 110° C under reduced pressure. To the resulting product was added the stannous octoate catalyst and the diisocyanate. The mixture so obtained was subjected to high speed mechanical stirring for 15 seconds and then poured into a shallow aluminum tray. The poured elastomer and tray were allowed to stand at room temperature (circa 20° C) for 24 hours. Thereafter the elastomer was chopped and then granulated and dried for 3 hours at 100° C. A test piece (a sheet 4.5 × 4.5 × 1/16 inches) was made from each elastomer by injection molding and submitted to physical testing. The properties of these test pieces are summarized in Table I. In addition, a portion of the granulated elastomer in each case was submitted to (i) melt viscosity determination using the Tinius Olson test conditions (ASTM D-1238), (ii) shear sensitivity study by observing the variation in torque (indication of viscosity: a change in torque indicates the heat degradation of polymer) on fluxing over a prolonged period in a Brabender Plasti-corder operated at 370°-380° F and recording the percentage difference in torque observed after 10 minutes and after 20 minutes fluxing and (iii) determination of solubility in tetrahydrofuran at 0.25% w/v. Details of the results of these tests are also recorded in Table I. It will be seen that the Elastomers B, C and D, all of which fall within the present invention, are clearly superior in melt viscosity, heat sensitivity and solubility as compared with Elastomer A which was prepared without the pretreatment of the diisocyanate with a monohydric alcohol.

TABLE I

| Elastomers | A | B | C | D |
| --- | --- | --- | --- | --- |
| 4,4'-methylenebis(phenyl isocyanate), equiv. | 2.35 | 2.37 | 2.37 | 2.37 |
| n-butanol, equivs. | — | — | 0.012 | 0.024 |
| dodecyl; alcohol, equivs. | — | 0.024 | — | — |
| polytetramethylene glycol (M.W. = 1000), equivs. | 1.0 | 1.0 | 1.0 | 1.0 |
| 1,4-butanediol | 1.3 | 1.3 | 1.3 | 1.3 |
| antioxidant (hindered phenol) % w/w | 0.25 | 0.25 | 0.25 | 0.25 |
| lubricant (amide wax) % w/w | 0.5 | 0.5 | 0.5 | 0.5 |
| stannous octoate % w/w | 0.05 | 0.05 | 0.05 | 0.05 |
| NCO/OH | 1.02/1 | 1.03/1 | 1.03/1 | 1.03/1 |
| Physical Properties | | | | |
| Tensile strength psi | 7320 | 6260 | 5810 | 6320 |
| Tensile modulus psi | | | | |
| at  50% | 760 | 735 | 675 | 640 |
| 100% | 900 | 920 | 900 | 830 |
| 300% | 1590 | 1765 | 2559 | 1560 |
| Elongation % | 535 | 530 | 410 | 580 |
| Tensile set % | 25 | 35 | 20 | 35 |
| Hardness, Shore A | 83 ± 3 | 83 ± 3 | 83 ± 3 | 83 ± 3 |
| Melt viscosity, Tinius Olson conditions[1] | | | | |
| Seconds to extrude 1 in. | 68 | 24 | 45 | 25 |
| Solubility at 0.25% w/v in tetrahydrofuran | Insoluble | Soluble | Soluble | Soluble |
| Shear sensitivity:% difference in torque determined at 10 mins. and 20 mins. fluxing | −18 | — | −3 | — |

[1]Orifice 4/1 (L/D); temp. 224° C; load on piston 1100 g.

As a further test of the amount of depression of the melt temperature achieved in Elastomers B and D above, the behaviour of these elastomers was compared with that of Elastomer A in a standard Monsanto Capillary Extrusion Rheometer [see Encyclopedia of Polymer Science and Technology, 8, 609,John Wiley and Sons, New York, 1968] using a pressure of 90 psi and 15/1 [Length/Diameter] orifice. It was found that the standard volume of each of Elastomers B and D could be extruded in 0.21 minutes at 375° F whereas, in order to extrude the same standard amount of Elastomer A, in the same time (0.21 minutes) and under the same pressure, it was necessary to operate the extruder at 397° F.

EXAMPLE 2

Using the procedure described in Example 1 an Elastomer E was prepared using the components and proportions shown in the Table II below. The n-butanol was prereacted with the 4,4'-methylenebis(phenyl isocyanate) in the manner described in Example 1. The physical properties and flow characteristics of the Elastomer E are set forth in Table II.

TABLE II

|  | Elastomer E |
|---|---|
| 4,4'-methylenebis(phenyl isocyanate); equivs. | 3.05 |
| n-butanol ; equivs. | 0.0183 |
| Tetramethylene glycol (M.W. = 1000); equivs. | 1.0 |
| 1,4-butanediol ; equivs. | 2.0 |
| Antioxidant (hindered phenol) % w/w | 0.4 |
| Lubricant (amide wax) % w/w | 0.5 |
| Stannous octoate % w/w | 0.03 |
| NCO/OH index | 1.015/1.0 |
| Physical Properties |  |
| Hardness, Shore A | 90 |
| Tensile Strengh psi | 5225 |
| Tensile Modulus psi |  |
| at 50% | 1130 |
| 100% | 1460 |
| 300% | 3540 |
| Elongation % | 390 |
| Melt viscosity Tinius Olson[1] 1100 g. | 37.6 |
| (seconds required to extrude 1 in.) 2060 g. | 19.8 |
| Extrudability | Good |

[1]Test run as in Example 1 with weights of 1100 g. and 2060 g. on piston.

EXAMPLE 3

Using the procedure set forth in Example 1, Elastomers F and G were prepared using the components and proportions shown in Table III below. The n-butanol was prereacted with the 4,4'-methylenebis(phenyl isocyanate) in the manner described in Example 1. The physical properties and flow characteristics of the elastomers are also set forth in Table III.

TABLE III

|  | Elastomers F | G |
|---|---|---|
| 4,4'-methylenebis(phenyl isocyanate); equivs. | 4.171 | 6.304 |
| n-butanol ; equivs. | 0.041 | 0.124 |
| polycaprolactone diol (M.W. = 2000) ; equivs. | 1.0 | 1.0 |
| 1,4-butanediol | 3.0 | 5.0 |
| stannous octoate % w/w | 0.05 | 0.05 |
| NCO/OH | 1.03 | 1.03 |
| Physical Properties |  |  |
| Tensile Strength psi | 5100 | 5250 |
| Tensile Modulus psi |  |  |
| at 50% | 800 | 1500 |
| 100% | 900 | 1700 |
| 200% | 1200 | 2000 |
| 300% | 1600 | 2800 |
| Elongation % | 650 | 575 |
| Tensile Set % | 75 | 110 |

Each of Elastomers F and G was submitted to melt viscosity determination using the Monsanto Capillary Extrusion Rheometer under the conditions described in Example 1. The operating temperature was 375° F. The following are the times taken to extrude a standard volume at the various time intervals (residence time in the extruder) shown. The figures shown for Control are the figures determined on a sample of material prepared exactly as described for Elastomers F and G but using unmodified diisocyanate.

|  | Extrusion Time (min.) | | |
|---|---|---|---|
| Heat Up Time (min.) | Elastomers F | G | Control |
| 5 | 0.17 | 0.10 | >5.00 |
| 10 | 0.16 | 0.11 | >5.00 |
| 15 | 0.18 | 0.11 | >5.00 |
| 20 | 0.18 | 0.12 | >5.00 |

We claim:

1. A thermoplastic polyurethane elastomer which is the product of reaction of an organic diisocyanate, a polymeric diol, and a difunctional extender, wherein said organic diisocyanate is the product of reaction of 4,4'-methylenebis(phenyl isocyanate) and from 0.0005 to 0.05 equivalents, per equivalent of diisocyanate, of a monohydric primary aliphatic alcohol having from 1 to 18 carbon atoms.

2. A thermoplastic polyurethane elastomer according to claim 1 wherein the monohydric aliphatic alcohol is butanol.

3. A thermoplastic polyurethane elastomer which is the product of reaction of an organic diisocyanate, a polymeric diol, and a difunctional extender, wherein said organic diisocyanate is the product of reaction of 4,4'-methylenebis(phenyl isocyanate) and from 0.0005 to 0.05 equivalents, per equivalent of diisocyanate, of the monobutyl ether of diethylene glycol.

4. A thermoplastic polyurethane elastomer according to claim 1 wherein the monohydric saturated aliphatic alcohol is dodecyl alcohol.

5. A thermoplastic polyurethane elastomer according to claim 1 wherein the overall ratio of equivalents of isocyanate to equivalents of active hydrogen containing materials is within the range of 0.95:1 to 1.10:1.

6. A thermoplastic polyurethane elastomer which is the product of reaction of:
   (a) a polyisocyanate obtained by the reaction of 4,4'-methylenebis(phenyl isocyanate) and from 0.001 to 0.02 equivalents, per equivalent of said diisocyanate, of a monohydric primary aliphatic alcohol having from 1 to 18 carbon atoms;
   (b) a polyether glycol having a molecular weight in the range of 500 to 3000; and
   (c) an aliphatic diol having from 2 to 6 carbon atoms, inclusive;

the ratio of isocyanate groups to hydroxyl groups being within the range of about 0.95:1 to about 1.10:1.

7. A thermoplastic polyurethane elastomer according to claim 6 wherein the monohydric alcohol employed in component (a) is n-butanol.

8. A thermoplastic polyurethane elastomer which is the product of reaction of:
   (a) a polyisocyanate obtained by the reaction of 4,4'-methylenebis(phenyl isocyanate) and from 0.001 to 0.02 equivalents, per equivalent of said diisocyanate, of the monobutyl ether of diethylene glycol;
   (b) a polyether glycol having a molecular weight in the range of 500 to 3000; and
   (c) an aliphatic diol having from 2 to 6 carbon atoms, inclusive;

the ratio of isocyanate groups to hydroxyl groups being within the range of about 0.95:1 to about 1.10:1.

9. A thermoplastic polyurethane elastomer according to claim 6 wherein the monohydric alcohol employed in component (a) is dodecyl alcohol.

10. A thermoplastic polyurethane elastomer according to claim 6 wherein the polyether glycol is a polytetramethylene glycol.

11. A thermoplastic polyurethane elastomer according to claim 10 wherein the polytetramethylene glycol has a molecular weight of about 1000.

12. A thermoplastic polyurethane elastomer according to claim 6 wherein the aliphatic diol of component (c) is butane-1,4-diol.

13. A thermoplastic polyurethane elastomer which is the product of reaction of:
   (a) a polyisocyanate obtained by the reaction of 4,4'-methylenebis(phenyl isocyanate) and from 0.001 to 0.02 equivalents, per equivalent of said diisocyanate, of a monohydric primary alcohol having from 1 to 18 carbon atoms;

(b) a polytetramethylene glycol having a molecular weight from about 500 to about 3000; and (c) 1,4-butanediol;

the ratio of isocyanate groups to hydroxyl groups being within the range of about 0.95:1 to about 1.10:1.

14. A thermoplastic polyurethane elastomer according to claim 13 wherein the monohydric alcohol employed in component (a) is n-butanol.

15. A thermoplastic polyurethane elastomer according to claim 13 wherein the monohydric alcohol employed in component (a) is dodecyl alcohol.

16. A thermoplastic polyurethane elastomer which is the product of reaction of:

(a) a polyisocyanate obtained by the reaction of 4,4'-methylenebis(phenyl isocyanate) and from 0.001 to 0.02 equivalents, per equivalent of said diisocyanate, of the monobutyl ether of diethylene glycol;

(b) a polytetramethylene glycol having a molecular weight from about 500 to about 3000; and (c) 1,4-butanediol; the ratio of isocyanate groups to hydroxyl groups being within the range of about 0.95:1 to about 1.10:1.

17. A diisocyanate comprising the product of reaction of 4,4'-methylenebis(phenyl isocyanate) and from 0.001 to 0.02 equivalents, per equivalent of said diisocyanate, of a monohydric aliphatic alcohol having from 1 to 18 carbon atoms.

18. A diisocyanate according to claim 17 wherein the monohydric aliphatic alcohol is n-butanol.

19. A diisocyanate according to claim 17 wherein the monohydric aliphatic alcohol is dodecyl alcohol.

20. A diisocyanate comprising the product of reaction of 4,4'-methylenebis(phenyl isocyanate) and from 0.001 to 0.02 equivalents, per equivalent of said diisocyanate, of the monobutyl ether of diethylene glycol.

21. A thermoplastic polyurethane elastomer according to claim 1 wherein said organic diisocyanate is the product of reaction of 4,4'-methylenebis(phenyl isocyanate) and from 0.001 to 0.02 equivalents, per equivalent of diisocyanate, of a monohydric aliphatic alcohol having from 1 to 18 carbon atoms.

* * * * *

UNITED STATES PATENT OFFICE
CERTIFICATE OF CORRECTION

Patent No. 4,080,314  Dated March 21, 1978

Inventor(s) Henry W. Bonk, et al.

It is certified that error appears in the above-identified patent and that said Letters Patent are hereby corrected as shown below:

Column 4, lines 14 and 15:   Should read:

as aliphatic                 as an aliphatic

Column 6, line 17:            Should read:

0.92:1                       0.95:1

Column 6, line 18:            Should read:

0.98.1                       0.98:1

*Signed and Sealed this*

*Eighteenth* Day of *July 1978*

[SEAL]

Attest:

RUTH C. MASON  
*Attesting Officer*

DONALD W. BANNER  
*Commissioner of Patents and Trademarks*